US011138978B2

(12) United States Patent
Szymanski et al.

(10) Patent No.: US 11,138,978 B2
(45) Date of Patent: Oct. 5, 2021

(54) TOPIC MINING BASED ON INTERACTIONALLY DEFINED ACTIVITY SEQUENCES

(71) Applicant: INTERNATIONAL BUSINESS MACHINES CORPORATION, Armonk, NY (US)

(72) Inventors: Margaret Helen Szymanski, Santa Clara, CA (US); Lei Huang, Mountain View, CA (US); Robert John Moore, San Jose, CA (US); Raphael Arar, San Jose, CA (US); Shun Jiang, San Jose, CA (US); Guangjie Ren, Belmont, CA (US); Eric Liu, Santa Clara, CA (US); Pawan Chowdhary, San Jose, CA (US); Chung-hao Tan, San Jose, CA (US); Sunhwan Lee, San Mateo, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 251 days.

(21) Appl. No.: 16/521,537

(22) Filed: Jul. 24, 2019

(65) Prior Publication Data
US 2021/0027783 A1 Jan. 28, 2021

(51) Int. Cl.
G10L 15/00 (2013.01)
G10L 17/00 (2013.01)
G10L 15/26 (2006.01)
G06N 3/08 (2006.01)
G06N 3/04 (2006.01)

(52) U.S. Cl.
CPC ............ *G10L 15/26* (2013.01); *G06N 3/0445* (2013.01); *G06N 3/08* (2013.01)

(58) Field of Classification Search
CPC ........ G06N 3/0445; G06N 3/08; G10L 15/26; G10L 25/48
USPC .............................. 704/9, 200, 231, 246, 257
See application file for complete search history.

(56) References Cited

U.S. PATENT DOCUMENTS

| 6,928,407 | B2 | 8/2005 | Ponceleon et al. |
| 7,281,022 | B2 | 10/2007 | Gruhl et al. |
| 8,611,523 | B2 | 12/2013 | Conway et al. |
| 9,378,065 | B2 * | 6/2016 | Shear .................... G06F 16/285 |
| 9,430,463 | B2 | 8/2016 | Futrell et al. |

(Continued)

OTHER PUBLICATIONS

Mell, P. et al., "Recommendations of the National Institute of Standards and Technology"; NIST Special Publication 800-145 (2011); 7 pgs.

*Primary Examiner* — Khai N. Nguyen
(74) *Attorney, Agent, or Firm* — Intelletek Law Group, PLLC; Gabriel Daniel, Esq.

(57) ABSTRACT

A method and system of automatically identifying topics of a conversation are provided. An electronic data package comprising a sequence of utterances between conversation entities is received by a computing device. Each utterance is classified to a corresponding social action. One or more utterances in the sequence are grouped into a segment based on a deep learning model. A similarity of topics between adjacent segments is determined. Upon determining that the similarity is above a predetermined threshold, the adjacent segments are grouped together. A transcript of the conversation including the grouping of the adjacent segments is stored in a memory.

20 Claims, 11 Drawing Sheets

(56) References Cited

U.S. PATENT DOCUMENTS

| | | | |
|---|---|---|---|
| 9,817,817 B2 | 11/2017 | Hosn et al. | |
| 10,044,862 B1* | 8/2018 | Cai | G06N 3/08 |
| 10,129,720 B1* | 11/2018 | Bouzid | G06F 3/0482 |
| 10,296,830 B2* | 5/2019 | Cai | G06F 40/35 |
| 10,540,971 B2* | 1/2020 | Kumar | H04L 12/1827 |
| 10,621,317 B1* | 4/2020 | Sardari | G06F 3/167 |
| 10,726,333 B2* | 7/2020 | Cai | G06N 5/003 |
| 2006/0020473 A1 | 1/2006 | Hiroe et al. | |
| 2007/0219792 A1* | 9/2007 | Normandin | G10L 17/24 |
| | | | 704/239 |
| 2008/0300872 A1 | 12/2008 | Basu et al. | |
| 2009/0030984 A1 | 1/2009 | Chen et al. | |
| 2013/0253924 A1 | 9/2013 | Ichimura et al. | |
| 2014/0282586 A1* | 9/2014 | Shear | G06F 16/285 |
| | | | 718/104 |
| 2018/0176269 A1* | 6/2018 | Griffin | H04L 65/403 |
| 2018/0316791 A1* | 11/2018 | Cai | G06N 7/005 |
| 2019/0189117 A1* | 6/2019 | Kumar | H04L 51/02 |
| 2020/0007474 A1* | 1/2020 | Zhang | G06F 40/20 |
| 2020/0356629 A1* | 11/2020 | Tan | G06F 40/289 |
| 2021/0027783 A1* | 1/2021 | Szymanski | G06N 3/0445 |

\* cited by examiner

| Social Action | Examples |
|---|---|
| Sequence Completion | Okay, alright |
| Appreciation | thank you, thanks a lot |
| Assessment | That's great, that is fine, that's encouraging |
| Speakership prompt | Go ahead, please proceed, the floor is yours |
| Termination announcement | I have a hard stop, five minute warning, we're getting kicked out, I need to drop off, wrap it up |
| Transition announcement | Let me take this opportunity to..., let's move into the next... |

FIG. 3

Kristen: I'll remove it and resend it around. [That's totally fine] ⟵406

Jeannette: [Thank you.] ⟵408

David: [Okay thanks.] ⟵410

Lakshmi: Yeah
(0.4)

Lakshmi: I used it because I liked the:: I liked it but it has these other things so, >in any case<
(2.0)

Jeannette: [okay/go ahead.]

David: Actually I mean you're saying - instead of sending it by mail, why don't we find a place to post variants of the template Kristen: [okay.]

David: on the wiki...
(0.4)

Kristen: can do that.
(0.2)

David: [okay.] (0.2) [Please proceed]Lakshmi.

Lakshmi: yeah huh. [Okay] just so that we are on the same page, the problem that we are trying to address is that when we detect OTUs from NGS reads using a database such as Silva and other things, we want to make a follow - the - it appears that there are a lot of false positives that we see when we do simulations. And what we are trying to do here is to reduce or deplete these false positives after the pipeline. Okay? So the assumption we are making is very basic, that is there is a universe OTU database that the reads have been compared against. And the pipeline could be the chirp pipeline, the microchirp that we have.

TOPIC MINING BASED ON INTERACTIONALLY DEFINED ACTIVITY SEQUENCES

BACKGROUND

Technical Field

The present disclosure generally relates to computer systems, and more particularly, to computer systems that are configured to extract topics from segments of conversation data.

Description of the Related Art

Today, analytics applications are increasingly used to make sense of human-human interactions. Interaction analytics can begin with raw data that may be based on multichannel interactions, such as SMS, chat transcripts, social media posts, recorded contact center calls, emails, and the like. Such raw data can then be transformed into structured data that can be filtered, sorted, searched, analyzed and stored to better understand interactions with a customer to better finetune internal processes and assure customer satisfaction.

SUMMARY

According to various embodiments, a computing device, a non-transitory computer readable storage medium, and a method are provided for determining topics of a conversation. An electronic data package including a sequence of utterances between conversation entities is received by a computing device. Each utterance is classified to a corresponding social action. transition boundaries are identified based on the social actions. One or more utterances between transition boundaries in the sequence are grouped into a segment based on a deep learning model. A similarity of topics between adjacent segments is determined. Upon determining that the similarity is above a predetermined threshold, the adjacent segments together are grouped together. A transcript of the conversation including the grouping of the adjacent segments is stored in a memory.

In one embodiment, the electronic data package comprises raw audio data. A speech of the raw audio data can be converted to text by way of natural language processing (NLP).

In one embodiment, a duration of silences between the utterances is identified and each duration included in the transcript.

In one embodiment, the classification of each utterance to a corresponding social action includes using concept expansion to identify the social action.

In one embodiment, each grouping of the one or more utterances into a segment is based on a common focused topic. The topic may be broadened for each iteration of merging the sequence of adjacent segments.

In one embodiment, each segment includes a sequence of adjacent utterances between transition boundaries.

In one embodiment, utterances that are not interactionally defined are removed to reduce the computational complexity and storage requirements of the computing device.

In one embodiment, the deep learning model is created by the computing device during a training phase, that includes receiving historical user interaction logs between conversation entities. For each interaction log concept expansion is used for a creation of a specialized dictionary for identifying social actions associated with each utterance in the interaction log. Each utterance is classified into a corresponding social action. One or more social actions in a sequence of the interaction log are grouped into a segment. The deep learning model may be a sequential recurrent neural network (RNN) having a predetermined window.

In one embodiment, the deep learning model is a many to one sequential recurrent neural network (RNN).

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3 illustrates a table that provides examples of social actions.

FIG. 4 is an example transcript of a conversation between several entities, consistent with an illustrative embodiment.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of automatically determining topics of various segments of a conversation. In recent years, there has been an increasing use of analytics applications to make sense of human to human interactions. However, the various topics of a conversation, cannot not always be accurately identified. A single conversation or meeting, collectively referred to herein as an interaction between entities, often includes multiple topics. In various scenarios, an entity can be a chatbot or an individual communicating by way of a user device.

Today, known modeling methods typically treat a conversation or a meeting as a monolithic text and assign a topic to the overall conversation, without regard to the features of the conversation, such as the different segments of a conversation and the topics thereof. For example, conversations can be divided into different stages, such as an opening, introduction to make a personal connection, finding some common ground (sometimes referred to as small-talk), a main topic, ancillary topics, and conclusion. What is provided herein is an automatic way of an appropriately configured computing device to comprehend a conversation, identify different stages of a conversation, extract therefrom one or more topics by way of a sequential, interactionally-grounded approach that reduces the computational resources of the computing device, while improving the computational accuracy. The results can be stored as a transcript that annotates the different topics of each segment of the conversation, which can improve the resolution of searches of topics. Generally, one or more social actions forms a transition/event boundary, which are used to divide the whole transcript into segments that may have topical meaning. For a given training data, sequential social actions within the boundary window (wherein the window size can be customized) are used to train a deep learning model. The trained model can be used to predict future boundaries. The techniques described herein may be implemented in a number of ways. Example implementations are provided below with reference to the following figures.

Example Architecture

Figure 1:
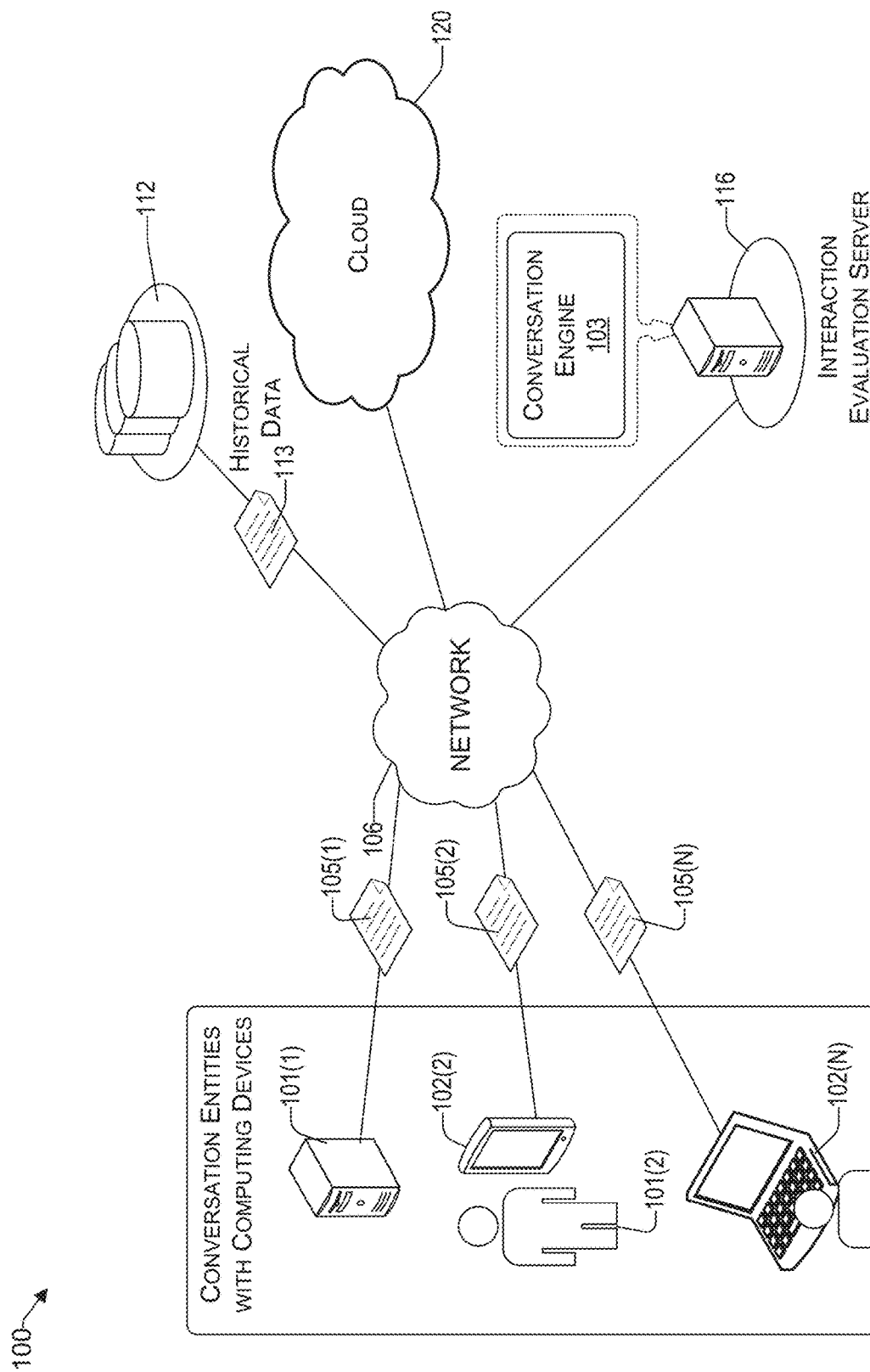
FIG. 1 illustrates an example architecture of a system for automatically determining topics of various segments of a conversation.

FIG. 1 illustrates an example architecture 100 of a system for automatically determining topics of various segments of a conversation. Architecture 100 may include one or more conversation entities 101(1) to 101(N) who can participate in conversations with each other by way of sending and receiving electronic data packages 105(1) to 105(N) over a network 106. The conversation entities are typically individuals (e.g., 101(2) and 101(N)) but may also include chatbots, represented by computing device 101(1). In various embodiments, the electronic data packages 105(1) to 105(N) may include various channels of communication, such as SMS, chat transcripts, social media posts, recorded contact center calls, emails, and/or raw voice data. For discussion purposes, it will be assumed that raw voice data is transmitted by the computing devices 102(1) to 102(N), while it will be understood that other types of communication is supported by the teachings herein.

The architecture 100 may further include a historical data repository 112 operative to provide training data 113, discussed in more detail later. The architecture 100 includes an interaction evaluation server 116 that hosts an interaction engine 103. There is a network that 106 allows the various conversation entities 102(1) to 101(N) communicate with each other, as well as for the interaction engine 103 to receive the electronic data packages 105(1) to 105(N) from the conversation entities and communicate with various resources connected to the network 106, such as the historical data repository 112. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various databases, potential participants, the Internet, and the cloud 120.

For discussion purposes, different user/computing devices appear in the drawing, to represent some examples of the client devices that may be used by a user or chatbot to communicate over the network 106. Today, user devices typically take the form of portable handsets, smart-phones, tablet computers, personal digital assistants (PDAs), and smart watches, although they may be implemented in other form factors, including consumer, medical, and business electronic devices.

The historical data repository 112 is configured to store and maintain a large set of historical data 113, sometimes referred to as massive data, which includes data related to prior conversations between various entities from which the interaction engine 103 can learn from. For example, the historical database 112 may provide training data related to conversations that have been successfully segmented and topics extracted therefrom. In one embodiment, the historical data 113 serves as a corpus of data from which the interaction engine 103 can learn from to create a sequential deep learning model that can then be used to evaluate various aspects of a conversation between one or more entities 102(1) to 102(N).

During a training stage, the interaction engine 103 is configured to receive the historical data 113 over the network 106 to create models therefrom. These models can then be used by the interaction engine 103, during an active stage, to facilitate at least one of: (i) convert speech received in electronic data packages 105(1) to 105(N) to text, (ii) perform speech segmentation, (iii) classify each utterance in the speech into a social action, and (iv) group one or more social actions in a sequence into a segment. Each of these features is discussed in more detail below.

It will be understood that the sheer volume of historical data 113 and the electronic data packages 10591) to 105(N) received by the interaction engine 103 may provide a technical challenge for the computing resources of the interaction evaluation server 116 hosting the interaction engine 103, including processing time and memory resources of the interaction evaluation server 116. In this regard, in one embodiment, the interaction engine 103 is configured to filter out utterances that are not interactionally defined. For example, utterances such as inconsequential phrases (e.g., incoherent, or inconsequential, such as "uhm," "ahh," "let me think," "like," etc.,), referred to herein as not being interactionally defined, are removed by the interaction engine. In this way, a technical effect of conserving valuable computing and storage resources of the interaction evaluation server 116 are achieved. By virtue of limiting the computation to a reduced pool of relevant data, the computational demand on the interaction evaluation server 116 is conserved, thereby providing a more efficient computational platform.

While the historical data repository 112 and the interaction evaluation server 116 are illustrated by way of example to be on different platforms, it will be understood that in different embodiments, these platforms may be combined. In other embodiments, one or more of these computing platforms may be implemented by virtual computing devices in the form of virtual machines or software containers that are hosted in the cloud 120, thereby providing an elastic architecture for processing and storage. The cloud is discussed in more detail later.

Example Block Diagram

Figure 2:
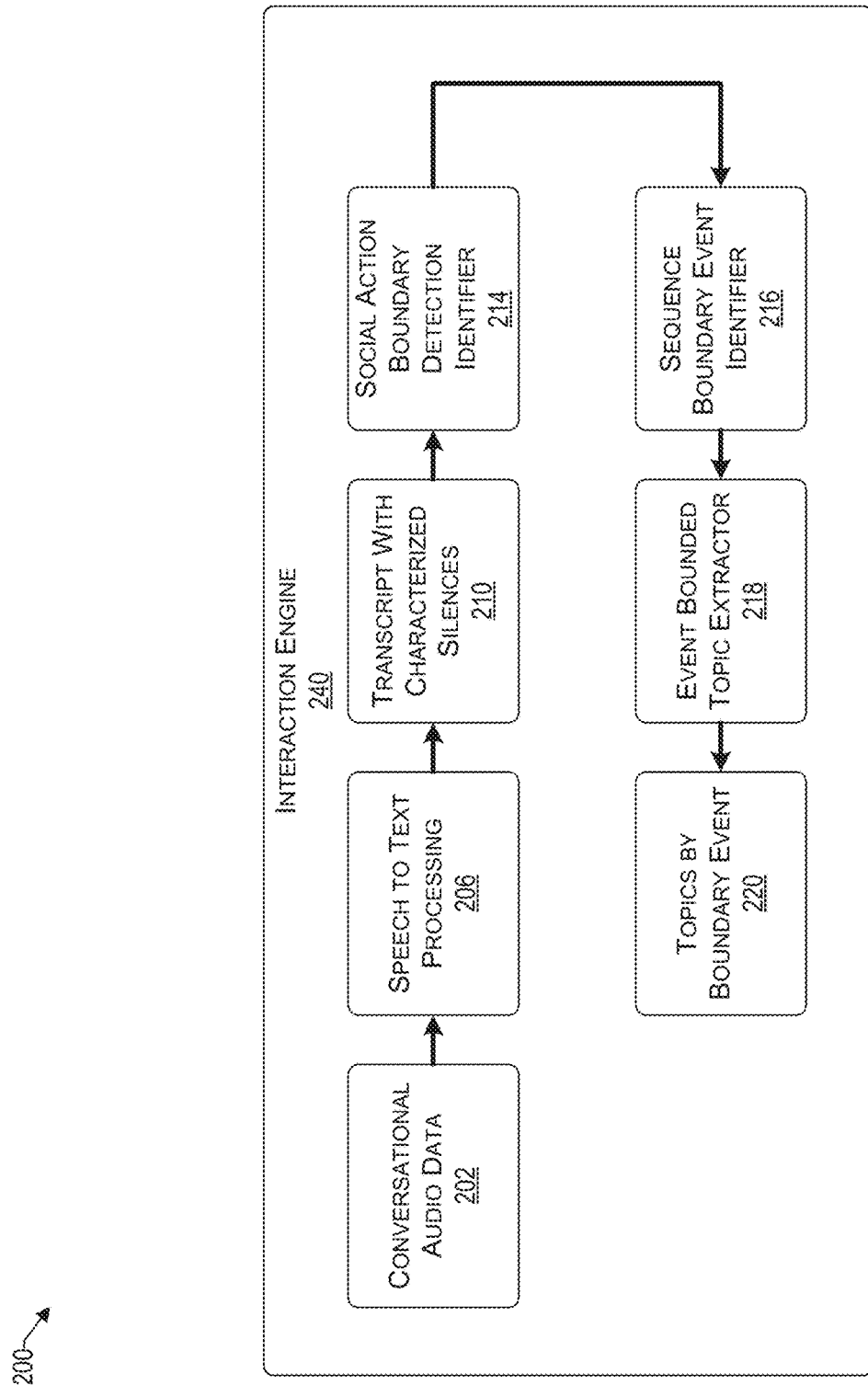
FIG. 2 is a conceptual block diagram of different building blocks of the interaction engine of FIG. 1, consistent with an illustrative embodiment.

Reference now is made to FIG. 2, which is a conceptual block diagram 200 of the different building blocks of the interaction engine of FIG. 1, consistent with an illustrative embodiment. In various embodiments, the different modules of the interaction engine can be implemented in hardware or software, as discussed in more detail in a later section.

The interaction engine includes a conversation module 202 that is operative to receive electronic data packages from various conversation entities. In the present example, it will be assumed that the electronic data packages received are raw audio files of a conversation between entities. Accordingly, in one embodiment, there is a speech to text processing module 206 that is operative to convert a raw audio data file to text. For example, the interaction engine 240 may use natural language processing (NLP) to process the raw natural language content of the conversational audio data. This natural language content may be provided as a text (e.g., short message system (SMS), e-mail, etc.,) or via voice. Regarding the latter, the speech to text processing module 206 of the interaction engine 240 can perform speech recognition to determine the textual representation thereof.

In natural speech, there may not be discernable pauses between successive words. To that end, speech segmentation may be performed to separate the words into meaningful sentences, represented by module 210. In one embodiment, module 210 provides a transcript with a characterization of the length of the silence (e.g., number of seconds there is a silence between sentences).

In one embodiment, concept expansion, such as the IBM Watson® concept expansion, can be used to identify the concept cues in each utterance to determine the intent thereof, sometimes referred to herein as a social action. To that end, the interaction engine 240 provides the transcript with characterized silences of module 210 to a social action boundary detection identifier module 214. As used herein, a social action is an utterance that can be categorized, such as a sequence completion, appreciation, assessment, speakership prompt, termination, etc. Stated differently it is a classification of an utterance into predetermined categories. The social action boundary detection identifier module 214 can be used to identify transitions from one topic to another. Thus, individual social actions or a sequence of social actions that are not related to a topic are regarded as transition boundaries, which can be used to separate segments having discernable topics.

In some scenarios, an utterance may fall under more than one category. Module 210 may filter out utterances that are not interactionally defined, thereby reducing the computational complexity and the storage requirements of the computing device of the interaction engine 240.

FIG. 3 illustrates a table 300 that provides examples of social actions. For example, a social action can be a sequence completion, such as "okay," "alright," etc. The social action of appreciation may be indicated by "thank you," etc., while an assessment may be indicated by "that is great," "that is fine, "that is encouraging," etc.

Returning to FIG. 2, in order to facilitate the social action boundary detection identifier 214 module, in one embodiment, large sets of unstructured sets of data may be received by the interaction engine 240 from a database, such as the historical data repository 112 of FIG. 1, from which it can learn from, during a training phase. The large sets of unstructured data may relate to prior conversational audio data that were successfully processed to identify the different topics therefrom, which now acts as a corpus of data to learn from. In various embodiments, the machine learning discussed herein may be supervised or unsupervised. In supervised learning, during a training phase, the interaction engine 103 may be presented with historical data 113 from the historical data repository 112 as data that is related to various segments, respectively. Put differently, the historical data repository 112 acts as a teacher for the interaction engine 103. In unsupervised learning, the historical data repository 112 does not provide any labels as what is acceptable, rather, it simply provides historic data 113 to the collaboration server 116, which can be used to find its own structure among the data to identify the correct segmentation of a conversation. In various embodiments, the machine learning may make use of techniques such as supervised learning, unsupervised learning, semi-supervised learning, naive Bayes, Bayesian networks, decision trees, neural networks, fuzzy logic models, and/or probabilistic classification models.

The concept expansion discussed herein enables the creation of a specialized dictionary for the cognitive application of identifying the social action associated with the utterance and topic thereof. Concept expansion enables the interaction engine 240 to build a specialized dictionary for the cognitive application of deciphering the content and ultimately the intent of each utterance. Thus, unstructured source text that may not include well-formed language, such as email, text messages, and text that has been extracted via speech recognition. Accordingly, the interaction engine 240 can correctly understand industry specific terminology, local euphemisms, and colloquial terms that traditional computing devices may be challenged with.

The interaction engine 216 includes a sequence event identifier module 216 that is operative to receive the sequence of social actions of the conversational audio data from the social action boundary detection identifier module 214 and group one or more social actions that are in a sequence into a segment. Thus, a segment may be as small as a single utterance or may include a sequence of social actions (i.e., a plurality of adjacent social actions). Each segment is based on a common topic that may be at a fine grain resolution. Stated differently, at this iteration, the most focused grouping of the topics is performed. As used herein, an iteration of segmentation is the evaluation of all segments for similarity. The process can be continued with additional iterations to further merge adjacent segments. For example, at an initial iteration of segmentation, each segment may have a fine grain (e.g., focused) topic of "how to improve yield in the DRAM portion of a new processor X." In subsequent iterations, the topic may be further generalized (e.g., "chip reliability") based on broadening criteria, discussed in more detail below.

The interaction engine 240 includes an event bounded topic extractor 218 module that is operative to group the sequential topics into broader topics. For example, the interaction engine 240 may evaluate two adjacent segments in a sequence to determine the similarity between the topics. By way of continuing the previous example, if segment A (e.g., comprising social actions 1 to 10) relates to the focused topic of "how to improve yield in the DRAM portion of a new processor X," and adjacent segment B (e.g., comprising social actions 11 to 20) relates to the focused topic of "the reasons why the performance of processor X deteriorates after 200 hours of operation," the event bounded topic extractor module 218 is operative to determine how related the two focused topics are (e.g., by way of a similarity function). If the similarity is above a predetermined threshold, then the two segments A and B are merged into a common segment having a broader topic (e.g., "chip reliability.) In one embodiment, the process of merging adjacent segments in a sequence continues until the similarity between segments is not above a predetermined threshold. The resulting topics are then provided by the interaction engine 240 by way of an output module 220.

Reference now is made to FIG. 4, which is an example transcript 400 of a conversation between several entities, consistent with an illustrative embodiment. For example, the transcript 400 may be generated by module 210 after the speech to text processing of module 206 of FIG. 2. For each utterance, the social action is identified (if present). For example, in the first sentence, the utterance "That's totally fine" 406 is identified to be consistent with the social action of "assessment." The next two sentences comprising "Thank you" and "Okay, thanks," (408, 410) are identified to be consistent with the social action of "appreciation" and "sequence completion," respectively. As discussed previously, in one embodiment, utterances that are not interactionally defined are removed from the transcript, thereby reducing the computational load on the interaction evaluation server hosting the interaction engine.

Figure 5:
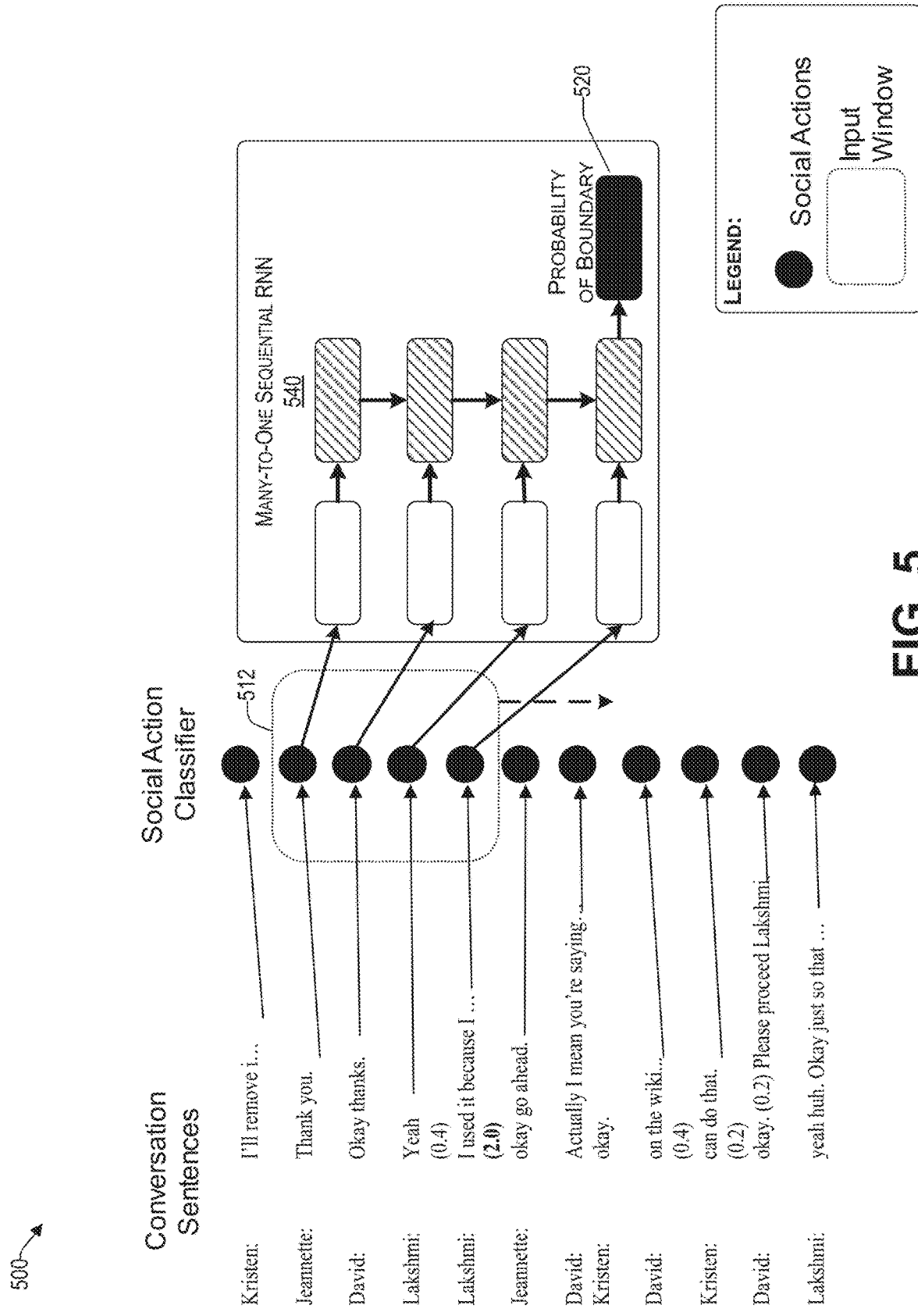
FIG. 5 is a block diagram of boundary detection of a conversation based on a recurrent neural network, consistent with an illustrative embodiment.

The interaction engine is able to group one or more social actions that are in a sequence into a segment, represented by segment 412. In one embodiment the boundary detection for the segment 412 is based on a deep learning model developed during a training phase, as discussed previously. For example, a recurrent neural network (RNN) may be used for boundary detection. In this regard, reference is made to FIG. 5, which is a block diagram 500 of boundary detection of a conversation, based on RNN, consistent with an illustrative embodiment. FIG. 5 illustrates a conversation between different entities (i.e., Kristen, Jeannette, David, and Lakshmi). For example, such conversation may be received as actual text transcript or in the form of raw audio data, which is converted to text by the interaction engine. In various embodiments, each utterance may be received contemporaneously (e.g., as the communication progresses) as a series of data files, or as a single data file upon completion of the conversation. Each utterance in the conversation is classified to a corresponding social action, represented in FIG. 5 by solid circles. Accordingly, the conversation sentences are converted into a sequence of social actions. The interaction engine applies a sequential RNN 540 that has a predetermined window 512 (having a length of four sentences in the present example). For example, the RNN used herein is a type of neural network where connections between social actions form a predetermined orderly cycle that is consistent with that of a topic. An RNN is able to analyze the sequence of social actions to identify a dynamic temporal behavior. Unlike feedforward neural networks, where connections between the units do not form a cycle, RNNs discussed herein can use their memory to process sequences of inputs provided by social action classifiers. Thus, RNN's can leverage the dependence of a previous state of an input (i.e., social action) to determine its next state. During a training phase, the RNN can learn a probability distribution over a sequence by being trained to determine whether a next social action is consistent with a topic. In one embodiment, the neural network used is a many to one sequential RNN 540 that provides as output a probability of a boundary 520.

Figure 6:
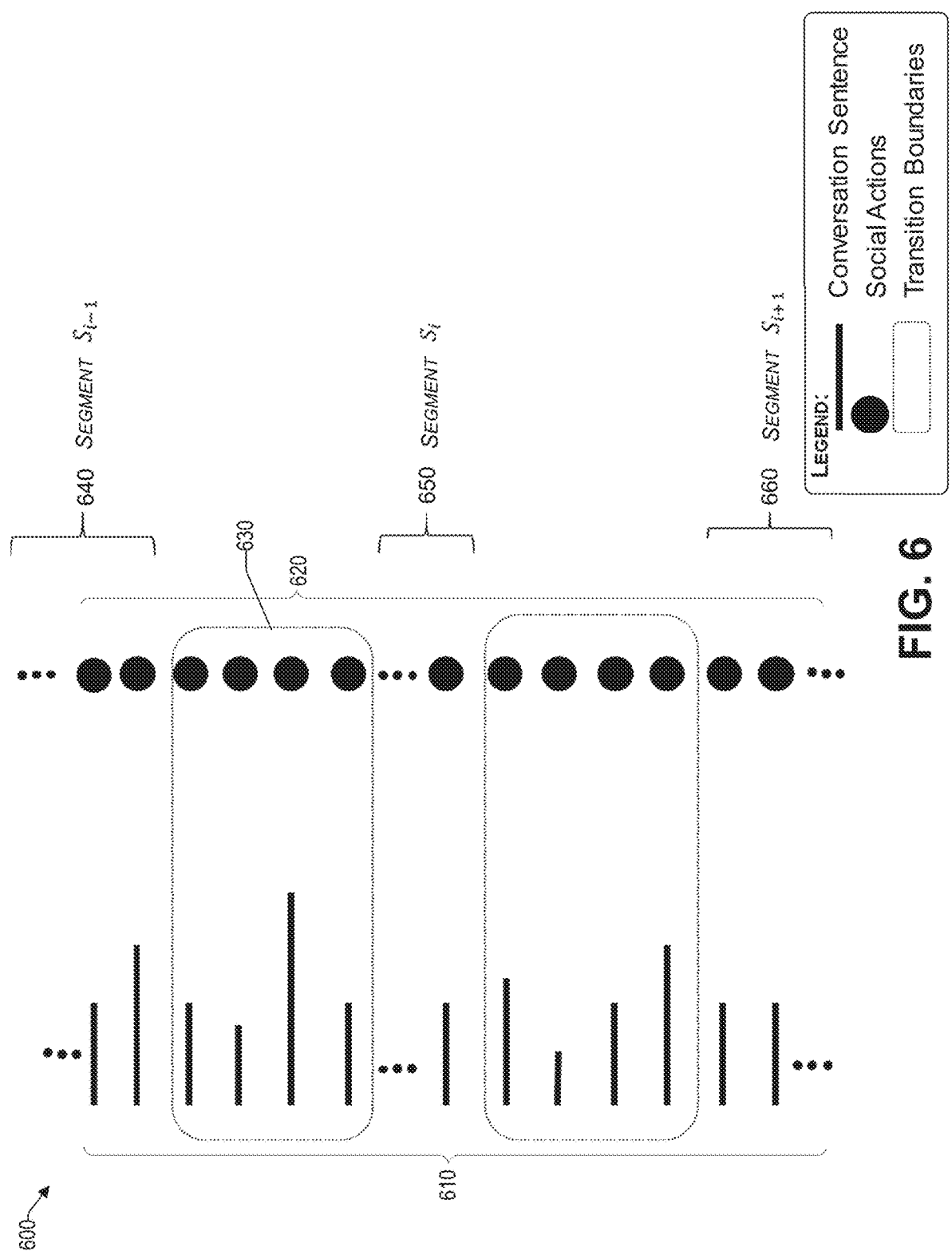
FIG. 6 illustrates an example boundary detection between segments of an interaction between entities, by way of a recurrent neural network, consistent with an illustrative embodiment.

FIG. 6 illustrates an example boundary detection between segments of an interaction between entities 600, by way of an RNN, consistent with an illustrative embodiment. In FIG. 6, the left part, represented by bold lines, indicate conversation sentences 610. For each sentence, a predetermined social action may or may not be found. In the example of FIG. 6, a black dot is used to represent a social action, if identified. If a social action cannot be identified, the field may be left empty. Then, a window (who's size can be customized) is used to slide down the social action sequence 620. For example, the window is moved down one by one. The social action sequence in the window is used as inputs for RNN to predict if the window is a transition boundary. After all transition boundaries are detected, they can be used to divide the original conversation sentences 610 into segments. Accordingly, the length of segments is unrelated to, and different from, the window size. We analyze the segment of original conversation sentences (not social actions) to understand the topical meaning, and measure the similarity of adjacent segments (topic_sim(si, sj)). Social actions are used to help find the transition/division boundary, and calculate the strength (seg_div($S_i$, $S_j$)) of dividing Si, Sj as two segments.

For example, the conversation includes various utterances, which are converted to sequence of sentences 610. Each utterance, which was converted to a sentence, is classified to a corresponding social action 620. In the sequence of social actions 620, social actions in a customized window size (e.g. size 4) are used as input for RNN to detect if they can be transition boundaries. For example, the social actions in the dashed rectangle 630 indicate detected transition boundaries, which divide the sequence of sentences 610 into segments $S_{i-1}$, $S_i$, and $S_{i+1}$ (640, 650, and 660, respectively). In one embodiment, the grouping of the segments into topics may be iterative. For example, the segmentation may be performed repeatedly between adjacent boundaries, such that similar topics are merged together if the similarity between the adjacent segments is above a predetermined threshold. This concept may be better understood in view of FIG. 7 discussed below.

Figure 7:
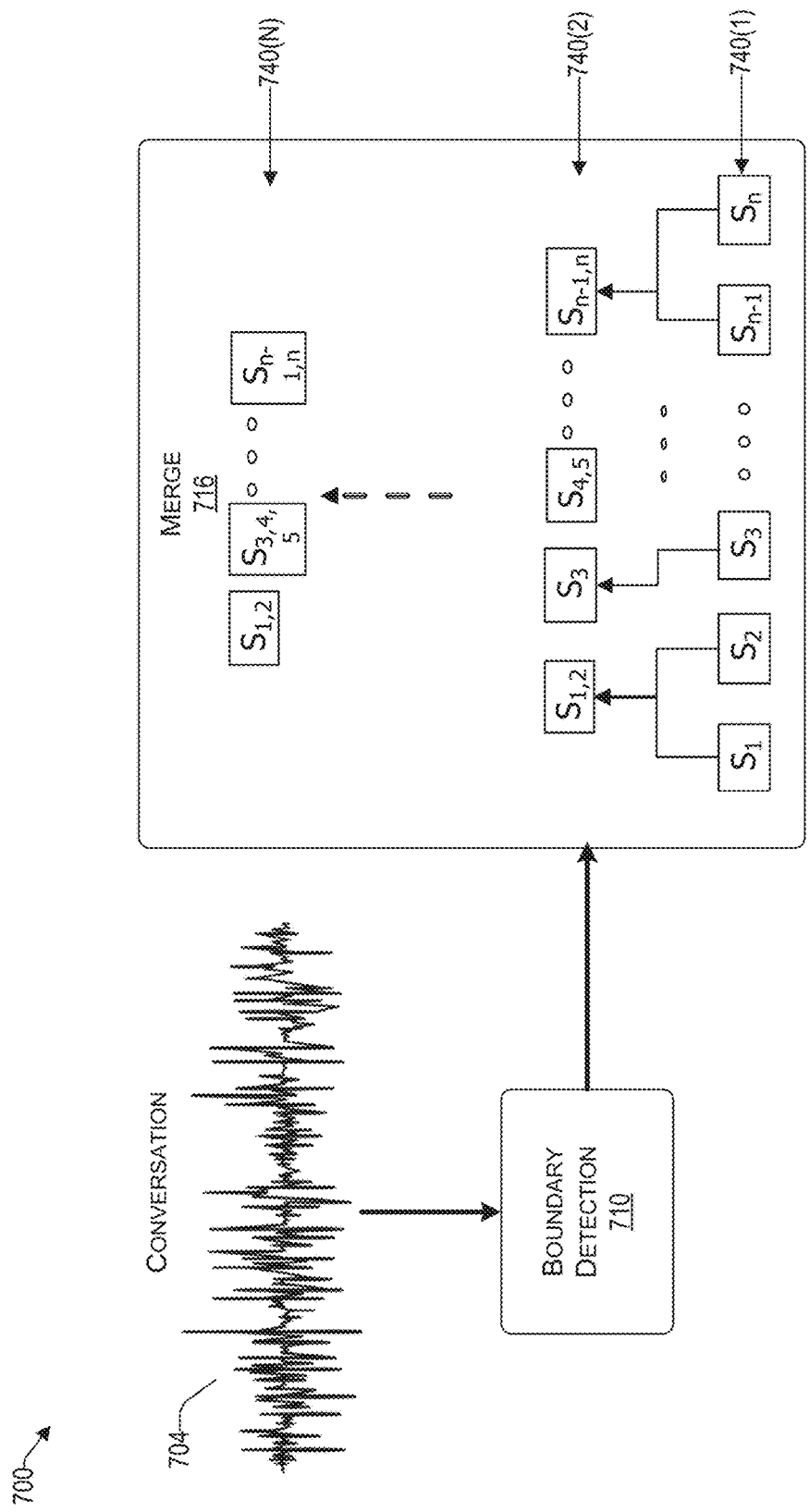
FIG. 7 illustrates a conceptual block diagram of an iterative merging of segments, consistent with an illustrative embodiment.

FIG. 7 illustrates a conceptual block diagram 700 of an iterative merging of segments, consistent with an illustrative embodiment. Consider a conversation 704 between entities, which may be recorded as raw audio data. The raw audio data is received by an interaction engine and its content processed such that sequential social actions identified therein are grouped into corresponding segments, represented by the boundary detection module 710. In the present example of FIG. 7, a first iteration 740(1), N segments are identified. Each segment represents a topic in the conversation. In one embodiment, the topic may be focused (i.e., of high resolution). For example, the topic for segment $S_1$ may relate to performance of chip A, the topic for segment $S_2$ may relate to performance of chip B, the topic for segment $S_3$ may relate to efficient marketing of chip A, and so forth. In a second iteration 740(2), segments that have a similarity that is above a predetermined threshold are grouped together. Equation 1 below provides an example relationship for the determination of a similarity between topics of adjacent segments in a sequence:

$$P_{merge}(S_i, S_j) \propto \frac{\text{topic\_sim}(S_i, S_j)}{\text{seg\_div}(S_i, S_j)} \quad \text{(Eq. 1)}$$

Where:

$S_i$ is a first segment having a topic i;

$S_j$ is an adjacent segment having a topic j;

topic_sim($S_i$, $S_j$) indicates the topic similarity between $S_i$, $S_j$; and seg_div($S_i$, $S_j$) indicates the strength of dividing Si, Sj as two segments, which is based on the segmentation method $f(\theta)$.

Equation 1 above can be used to calculate the score of how likely segments $S_i$ and $S_j$ could be merged. The score is inversely proportional to seg_div($S_i$, $S_j$), and directly proportional to topic_sim($S_i$, $S_j$). Topic_sim($S_i$, $S_j$) measures topical similarity between $S_i$ and $S_j$, and seg_div($S_i$, $S_j$) can be used calculate the score of separating $S_i$ and $S_j$, which can be based on the probability of boundary 520 discussed in the context of FIG. 5 previously. Equation 1 is provided by way of example and not by way of limitation, as in various embodiments, different methods can be used to calculate such scores.

The interaction engine compares adjacent segments to determine their similarity. In various embodiments, the comparison may be overlapping (e.g., $S_1$ with $S_2$; $S_2$ with $S_3$; $S_3$ with $S_4$; etc.) or non-overlapping (e.g., $S_1$ with $S_2$; $S_3$ with $S_4$; $S_5$ with $S_6$; etc.) in each iteration. Accordingly, in the example of FIG. 7, in the second iteration 740(2), segments $S_1$ and $S_2$ are grouped together into a common segment $S_{1,2}$, whereas segment $S_3$ remains alone in the group. In one embodiment, the similarity threshold is reduced in each iteration, thereby being able to merge a larger number of segments into a broader topic.

The iterative process continues until the similarity between segments is not above a predetermined threshold, represented by iteration 740(N), which has substantially reduced the number of common segments as compared to the initial iteration 740(1).

Example Process

Figure 8:
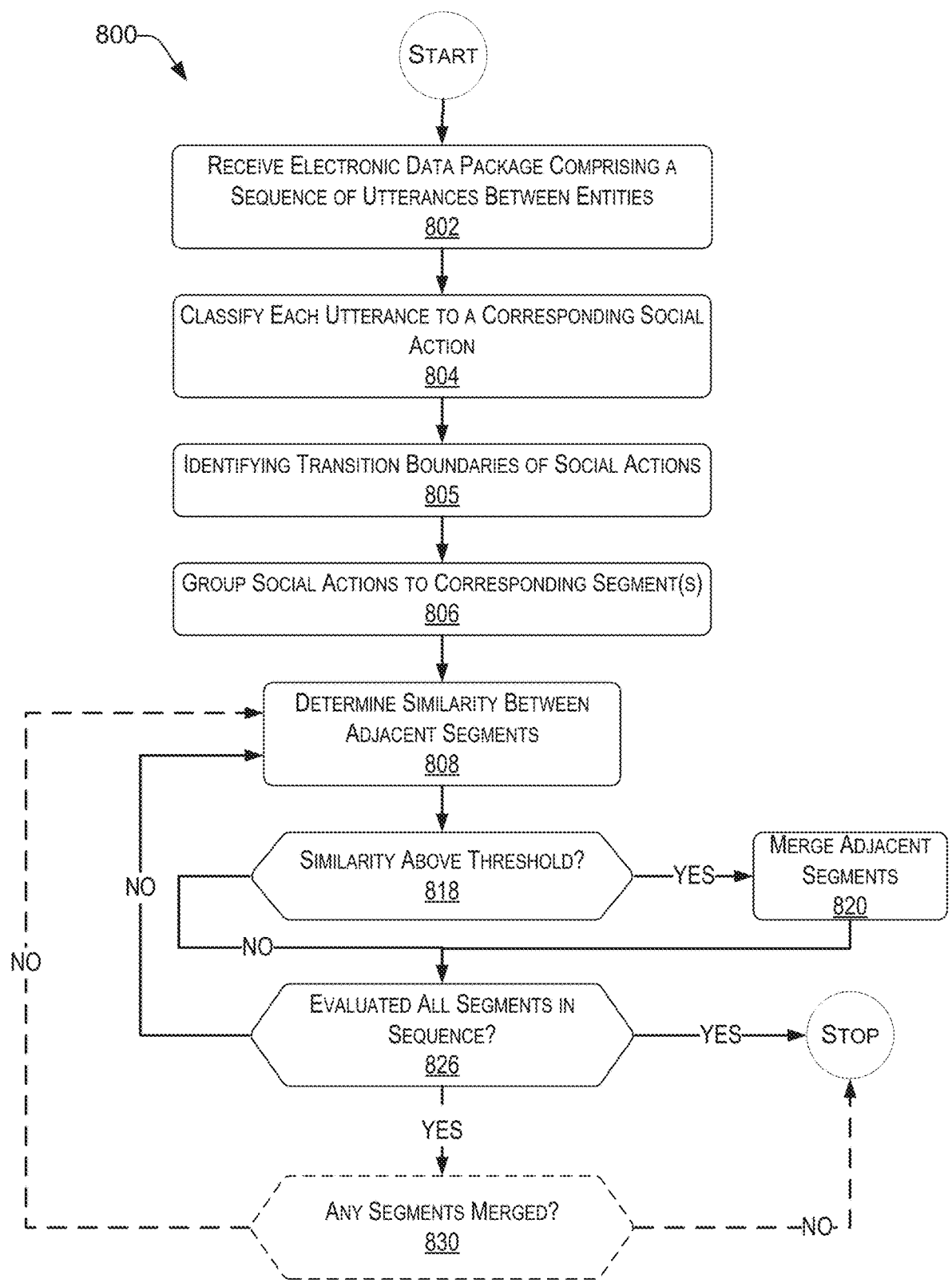
FIG. 8 presents an illustrative process of automatically determining topics of various segments of a conversation by way of an appropriately configured computing device, consistent with an illustrative embodiment.

With the foregoing overview of the example architecture 100 and conceptual block diagrams 200 and 500 to 700, it may be helpful now to consider a high-level discussion of an example process. To that end, FIG. 8 presents an illustrative process 800 of automatically determining topics of various segments of a conversation by way of an appropriately configured computing device, consistent with an illustrative embodiment. Process 800 is illustrated as a collection of blocks in a logical flowchart, which represents sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 800 is described with reference to the architecture 100 of FIG. 1.

At block 802 the interaction engine 103 of the interaction evaluation server 116 receives an electronic data package comprising a sequence of utterances between entities, over the network 106. In various embodiments, the electronic data package may include SMS, chat transcripts, social media posts, recorded contact center calls, emails, and/or raw voice data. For discussion purposes only, and not by way of limitation, it will be assumed that raw voice data is transmitted by the computing devices 102(1) to 102(N). The interaction engine 103 includes a text processing module that is operative to convert the raw audio data file to text. NLP may be used to process the raw natural language content of the conversational audio data and speech segmentation may be performed to separate the words into meaningful sentences.

At block 804, each utterance is classified by the interaction engine 103 to a corresponding social action.

At block 805, transition boundaries are identified. In one embodiment, utterances that are not interactionally defined, are removed by the interaction engine 103.

At block 806, one or more adjacent social actions in the sequence are grouped into a corresponding segment. For example, adjacent social actions of a conversation that are between transition boundaries are divided into one or more groups based on one or more fine grain topics, respectively. Each segment may comprise a sequence of adjacent social actions.

At block 808, the similarity of the topic between adjacent segments is determined. If the similarity is above a predetermine threshold (i.e., "YES" at decision block 818), then the process continues with block 820, where the adjacent segments having a topic similarity that is above the predetermined threshold, are merged into a common segment. The process then continues with block 826. However, if the similarity is not above the predetermined threshold (i.e., "NO" at decision block 818), the process goes directly to block 826, where a determination is made whether all segments in the sequence have been evaluated for similarity of topic. If not (i.e., "NO" at decision block 826), the process returns to block 808 until all segments have been evaluated in the present iteration. However, upon determining that all segments in the sequence have been evaluated for similarity of topic (i.e., "YES" at decision block 626) in the present iteration, the process stops.

In one embodiment, multiple iterations are performed. For example, upon determining that all segments in the sequence have been evaluated for similarity of topic (i.e., "YES" at decision block 626), the process continues with block 830, where a determination is made whether any segments were merged in the present iteration. If not (i.e., "NO" at decision block 830), it is indicative that the segments were sufficiently merged, and the process stops. However, upon determining that one or more segments in the present iteration have been merged so (i.e., "YES" at decision block 830), it is indicative that the segments may be merged further, as discussed previously in the context of FIG. 6. Accordingly, the process returns to block 808 and the adjacent segments are evaluated for similarity. In one embodiment, the threshold for comparison is loosened between each iteration.

Example Computer Platform

Figure 9:
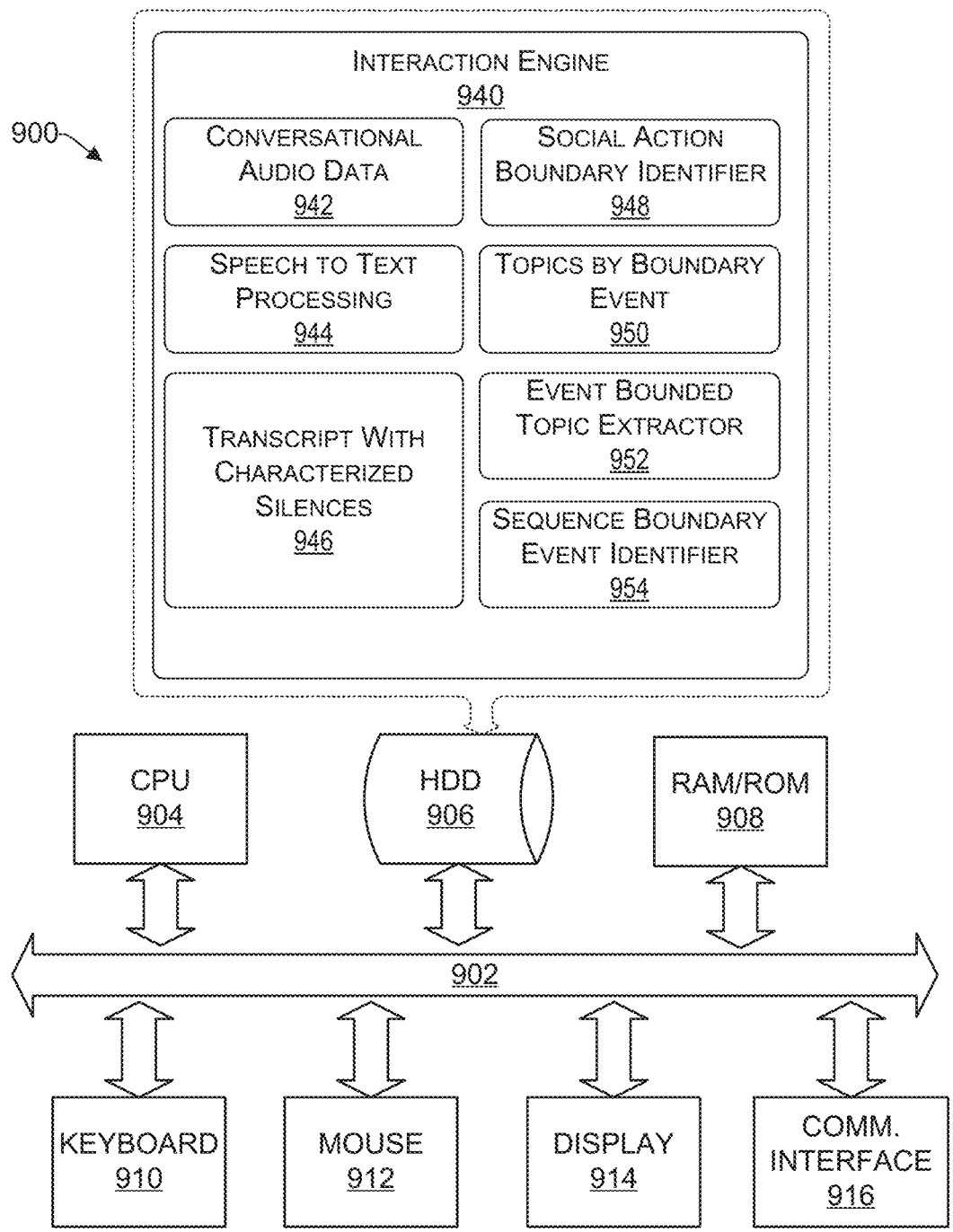
FIG. 9 provides a functional block diagram illustration of a computer hardware platform that can be used to implement a particularly configured computing device that can host an interaction engine.

As discussed above, functions relating to automatically determining the quality of a UX design, can be performed with the use of one or more computing devices connected for data communication via wireless or wired communication, as shown in FIG. 1 and in accordance with the process 800 of FIG. 8. FIG. 9 provides a functional block diagram illustration of a computer hardware platform 900 that can be used to implement a particularly configured computing device that can host an interaction engine 940. In particular, FIG. 9 illustrates a network or host computer platform 900, as may be used to implement an appropriately configured server, such as the interaction evaluation server 116 of FIG. 1.

The computer platform 900 may include a central processing unit (CPU) 904, a hard disk drive (HDD) 906, random access memory (RAM) and/or read only memory (ROM) 908, a keyboard 910, a mouse 912, a display 914, and a communication interface 916, which are connected to a system bus 902.

In one embodiment, the HDD 906, has capabilities that include storing a program that can execute various processes, such as the interaction engine 940, in a manner described herein. The interaction engine 940 may have various modules configured to perform different functions, such those discussed in the context of FIG. 2 and others. For example, there may be a conversation module 942, speech to text processing module 944, a module to provide a transcript with characterized silences 946, a social action boundary identifier module 948, topics by boundary event module (sometimes referred to herein as output module), event bounded topic extractor module 952, and sequence boundary event identifier module 954. Each of these modules were discussed previously in the context of description of FIG. 2 and are therefore not repeated here for brevity. While modules 942 to 954 are illustrated in FIG. 9 to be part of the HDD 906, in some embodiments, one or more of these modules may be implemented in the hardware of the computing device 900. For example, the modules discussed herein may be implemented in the form of partial hardware and partial software. That is, one or more of the components of the interaction engine 940 shown in FIG. 9 may be implemented in the form of electronic circuits with transistor(s), diode(s), capacitor(s), resistor(s), inductor(s), varactor(s) and/or memristor(s). In other words, interaction engine 940 may be implemented with one or more specially-designed electronic circuits performing specific tasks and functions described herein.

In one embodiment, a program, such as Apache™, can be stored for operating the system as a Web server. In one embodiment, the HDD 906 can store an executing application that includes one or more library software modules, such as those for the Java® Runtime Environment program for realizing a JVM (Java® virtual machine).

Example Cloud Platform

As discussed above, functions relating to managing the compliance of one or more client domains, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
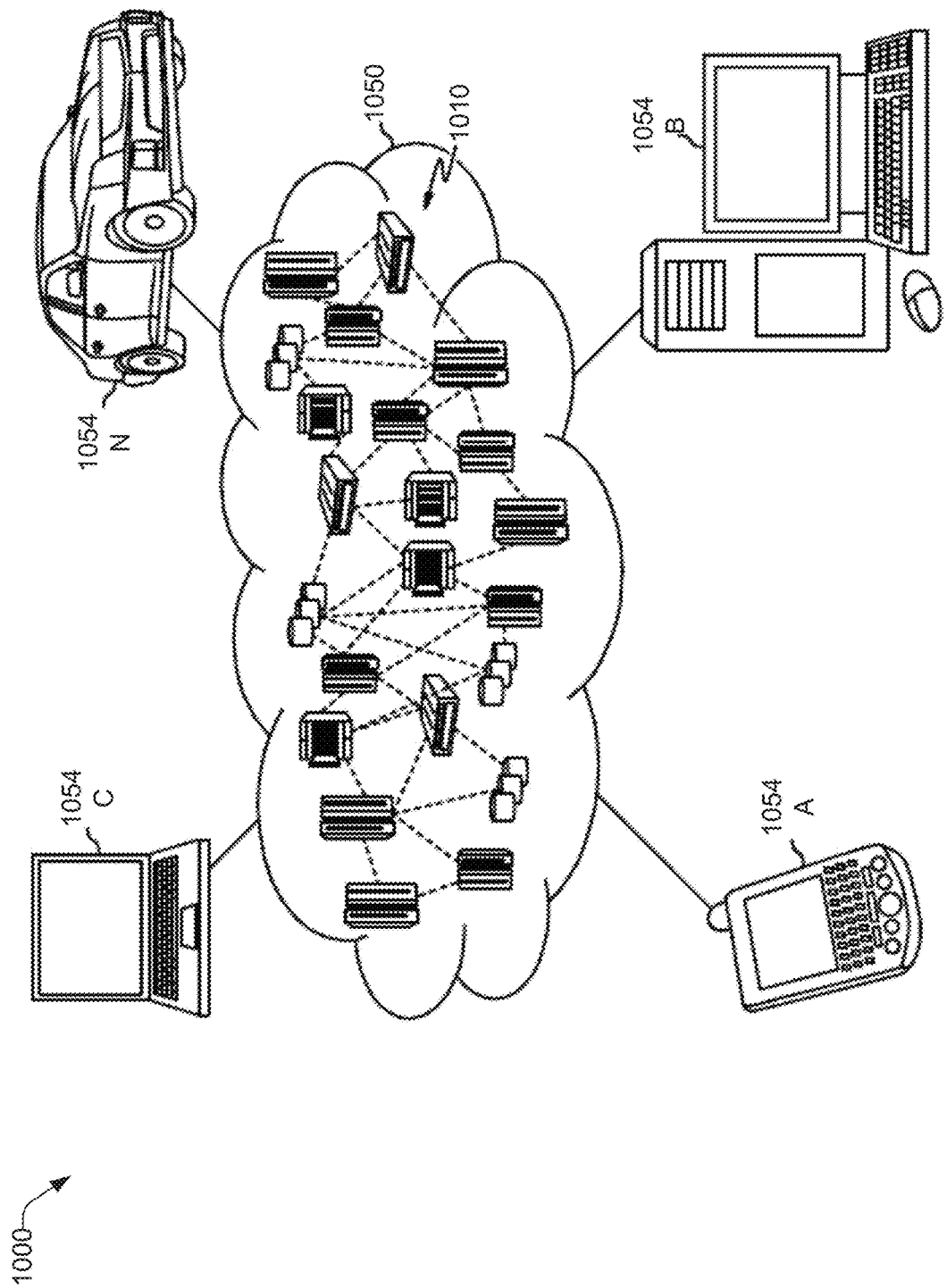
FIG. 10 depicts a cloud computing environment, consistent with an illustrative embodiment.

Referring now to FIG. 10, an illustrative cloud computing environment 1000 is depicted. As shown, cloud computing environment 1000 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
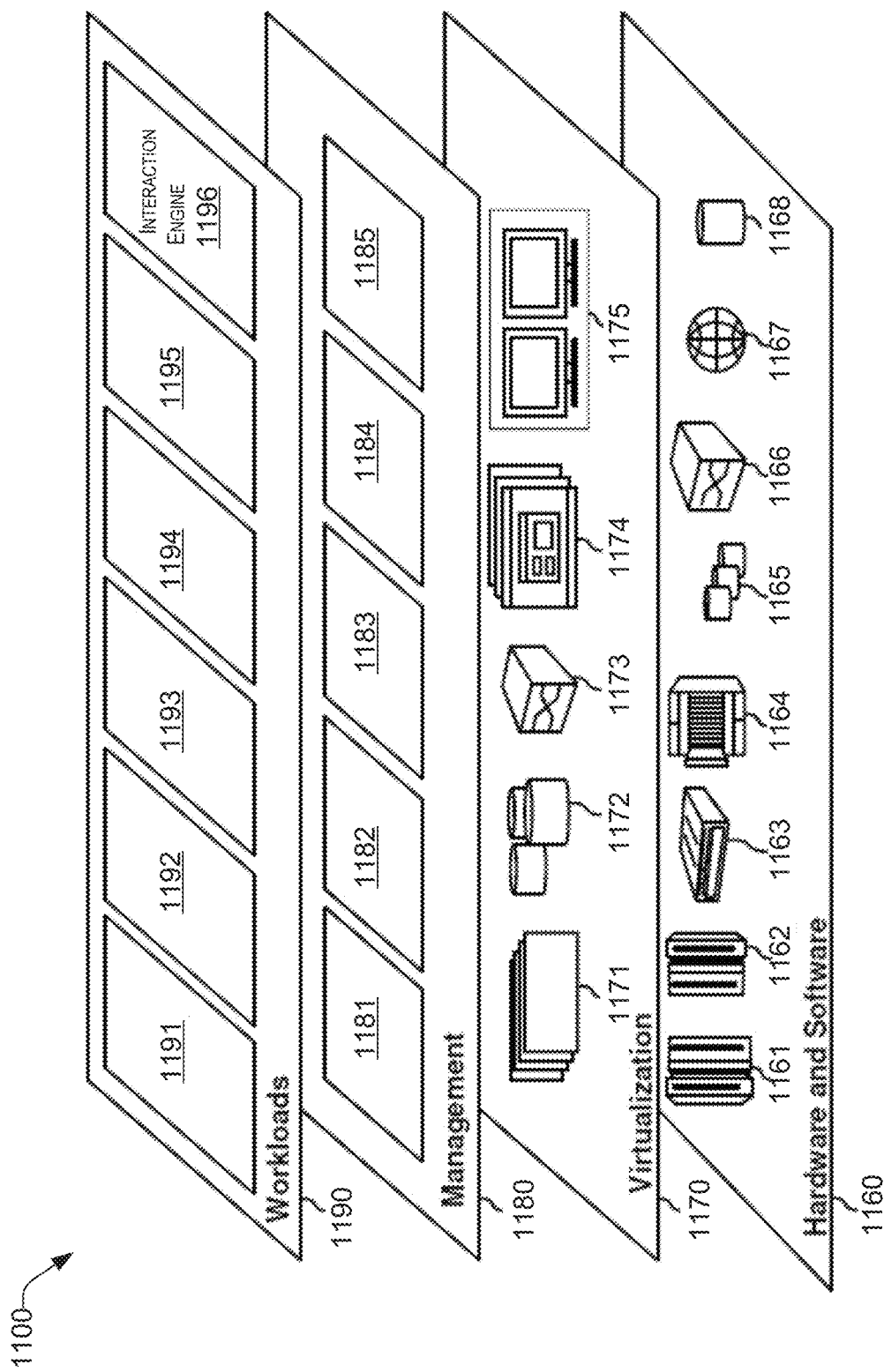
FIG. 11 depicts abstraction model layers, consistent with an illustrative embodiment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and interaction engine 1196, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
    a processor;
    a network interface coupled to the processor to enable communication over a network;
    an interaction engine configured to perform acts comprising:
        receiving an electronic data package comprising a sequence of utterances between conversation entities, over the network;
        classifying each utterance to a corresponding social action;
        identifying transition boundaries based on the social actions;
        grouping one or more utterances between transition boundaries in the sequence to a segment based on a deep learning model;
        determining a similarity of topics between adjacent segments; and
        upon determining that the similarity is above a predetermined threshold, grouping the adjacent segments together; and
        storing a transcript of the conversation including the grouping of the adjacent segments in the memory.

2. The computing device of claim 1, wherein the electronic data package comprises raw audio data.

3. The computing device of claim 2, wherein the interaction engine is further configured to perform acts, comprising: converting a speech of the raw audio data to text by way of natural language processing (NLP).

4. The computing device of claim 2, wherein the interaction engine is further configured to perform acts, comprising:
    identifying a duration of silences between the utterances; and
    including each duration in the transcript.

5. The computing device of claim 1, wherein the classification of each utterance to a corresponding social action comprises using concept expansion to identify the social action.

6. The computing device of claim 1, wherein each grouping of the one or more utterances into a segment is based on a common focused topic.

7. The computing device of claim 6, wherein the topic is broadened for each iteration of merging the sequence of adjacent segments.

8. The computing device of claim 1, wherein each segment comprises a sequence of adjacent utterances between transition boundaries.

9. The computing device of claim 1, wherein the interaction engine is further configured to perform acts, comprising: removing out utterances that are not interactionally defined to reduce the computational complexity and storage requirements of the computing device.

10. The computing device of claim 1, wherein the deep learning model is created by the computing device during a training phase, comprising:
receiving historical user interaction logs between conversation entities;
for each interaction log:
using concept expansion for a creation of a specialized dictionary for identifying social actions associated with each utterance in the interaction log;
classifying each utterance into a corresponding social action; and
grouping one or more utterances associated with social actions in a predetermined window in a sequence of the interaction log to a transition boundary.

11. The computing device of claim 10, wherein the deep learning model is a sequential recurrent neural network (RNN) having a predetermined window.

12. The computing device of claim 1, wherein the deep learning model is a many to one sequential recurrent neural network (RNN).

13. A non-transitory computer readable storage medium tangibly embodying a computer readable program code having computer readable instructions that, when executed, causes a computer device to carry out a method of determining topics of a conversation, the method comprising:
receiving an electronic data package comprising a sequence of utterances between conversation entities;
classifying each utterance to a corresponding social action;
identifying transition boundaries based on the social actions; grouping one or more utterances between transition boundaries in the sequence to a segment based on a deep learning model;
determining a similarity of topics between adjacent segments; and
upon determining that the similarity is above a predetermined threshold, grouping the adjacent segments together; and
storing a transcript of the conversation including the grouping of the adjacent segments in the memory.

14. The non-transitory computer readable storage medium of claim 13, wherein the electronic data package comprises raw audio data.

15. The non-transitory computer readable storage medium of claim 14, further comprising: converting a speech of the raw audio data to text by way of natural language processing (NLP).

16. The non-transitory computer readable storage medium of claim 13, wherein the classification of each utterance to a corresponding social action comprises using concept expansion to identify the social action.

17. The non-transitory computer readable storage medium of claim 13, wherein each grouping of the one or more utterances into a segment is based on a common focused topic.

18. The non-transitory computer readable storage medium of claim 17, wherein the topic the predetermined threshold is replaced with has a more loose threshold for each iteration of merging the sequence of adjacent segments.

19. The non-transitory computer readable storage medium of claim 13, wherein the deep learning model is created during a training phase, comprising:
receiving historical user interaction logs between conversation entities;
for each interaction log:
using concept expansion for a creation of a specialized dictionary for identifying social actions associated with each utterance in the interaction log;
classifying each utterance of the interaction log into a corresponding social action; and
grouping one or more utterances in a predetermined window in a sequence of the interaction log to a transition boundary.

20. The non-transitory computer readable storage medium of claim 19, wherein the deep learning model is a many to one sequential recurrent neural network (RNN) having a predetermined window.

* * * * *